(12) United States Patent
Kuroiwa et al.

(10) Patent No.: US 6,490,404 B1
(45) Date of Patent: Dec. 3, 2002

(54) INFORMATION RECORDING MEDIUM, AND EDITING APPARATUS AND METHOD THEREFOR

(75) Inventors: Toshio Kuroiwa, Yokohama (JP); Junzo Suzuki, Yokohama (JP); Takayuki Sugahara, Yokosuka (JP)

(73) Assignee: Victor Company of Japan Limited, Kanagawa (JP)

( * ) Notice: Subject to any disclaimer, the term of this patent is extended or adjusted under 35 U.S.C. 154(b) by 0 days.

(21) Appl. No.: 09/343,153

(22) Filed: Jun. 29, 1999

(30) Foreign Application Priority Data

Jun. 30, 1998 (JP) ............................................ 10-184804

(51) Int. Cl.[7] ................................................. H04N 5/76
(52) U.S. Cl. ............................ 386/52; 386/65; 386/95; 360/13; 369/83
(58) Field of Search .......................... 386/1, 4, 45, 46, 386/95, 125–126, 52, 55, 64, 65; 369/83, 84, 47.1, 47.13, 47.12, 47.2, 47.21, 47.22, 59.1; 360/13, 18, 20, 27, 39, 55; 707/200, 205, 202; H04N 5/76, 5/92, 9/79, 8/181

(56) References Cited

U.S. PATENT DOCUMENTS 5,926,821 A * 7/1999 Hirose et al. ............... 707/202

6,374,250 B2 * 4/2002 Ajtai et al. .................. 707/101

FOREIGN PATENT DOCUMENTS

JP          09-023404          1/1997

* cited by examiner

*Primary Examiner*—Thai Tran
(74) *Attorney, Agent, or Firm*—Anderson Kill & Olick; Eugene Lieberstein; Michael N. Meller

(57) ABSTRACT

In case that a skipping section is provided by editing in a recording region other than a recording region for block data in an information recording medium recorded with at least more than one collation table of time recording location, which is composed of more than one collation data by each fixed time interval and time compensating data, a collation table of time recording location is read out from the information recording medium and divided in response to a designated skipping period. A collation data, which assigns block data of designated skipping period, are deleted. A second time compensating data is calculated in response to the skipping period. Combining the second time compensating data with collation data succeeding the deleted collation data composes a new collation table of time recording location. The new collation table of time recording location is written back to the information recording medium in conjunction with a collation table of time recording location temporally preceding the deleted data.

3 Claims, 8 Drawing Sheets

INFORMATION RECORDING MEDIUM, AND EDITING APPARATUS AND METHOD THEREFOR

BACKGROUND OF THE INVENTION

1. Field of the Invention

The present invention relates to an information recording medium and an editing apparatus therefor, particularly, relates to a rewritable information recording medium which is divided into a plurality of sectors having predetermined volume of data, and relates to an editing apparatus and method of editing audiovisual information recorded in the information recording medium.

2. Description of the Related Art

It is commonly performed that data of digital audiovisual information are compressed and the compressed data are recorded in an information recording medium with recent progress and development of information processing technology. With respect to video information, particularly, a total volume of information content is huge. Therefore a high degree compression technology is utilized for an information recording medium so as to utilize limited volume of information content of the information recording medium effectively. The high degree compression technology is represented by not only data compression by correlation within one frame, which is a unit of video, but also a method of compressing data by correlation among a plurality of frames, which are adjacent to each other temporally. It is widely utilized for recording and transmitting video information.

In case of editing a result of data compression of video information, it is impossible to delete a frame by frame if a frame correlation is utilized. It is caused by that a frame to be referred can not be decoded if a referring frame to be correlated is deleted. Therefore, it is commonly prepared for a subsequent editing process that a plurality of frames are grouped in blocks and the blocks are encoded so as to be able to process them independently without processing frame correlation among the blocks. These block data, which are encoded block by block basis, are well known that each data volume varies by complexity of video signal in a block or a degree of correlation among frames.

Block data mentioned above are recorded on an information recording medium. However, it is necessary to be considered that a search operation can easily be performed in a reproduction process with arranging the block data in a sector from a head of the sector so as to occupy an integer number of sectors. It is realized by a well-known method that block data are encoded with including embedded data at an end of the block data. Accordingly, block data are recorded in an information region "A" as shown in FIG. 1.

It is commonly performed that a video information is grouped in blocks by an individual number of frames so as to compress the video information efficiently. In other words, it shall be considered that a displaying period of each block shown in FIG. 1 is different from each other by a frame period as a unit. In addition thereto, a volume of block data is different from each other as shown in FIG. 1 since compression ratio per block is different from each other.

In case that the above mentioned method is compared with other method such as linear pulse code modulation (PCM) which is not compressed and has a proportional relation between a elapsed time and a total volume of coded data, it is conceivable that a search reproduction starting reproduction from a block data array at a designated timing is very difficult by the above mentioned method.

To solve the above-mentioned problem, the Japanese Patent Laid-open Publication No. 9-23404/1997, which is titled as "Medium Recording Method, Apparatus Therefore and Medium Reproduction Apparatus", discloses that a search reproduction is performed by using a collation table which is previously recorded as a collation table of time recording location. According to the medium recording method disclosed in the above mentioned Japanese Patent Laid-open Publication, video information as prescribed main information is encoded by the MPEG (Moving Picture Experts Group) system, which is an international standard of moving picture, and a plurality of GOPs (Group of Pictures), which is a unit of compression, are produced, then the produced plural GOPs are recorded on a recording medium. In case that the video information is divided by a predetermined time unit, a start address of data at each time unit is produced and recorded on a recording medium in conjunction with plural GOPs.

According to the medium recording method, a collation table of time recording location is composed of arrays of reproduction start address at each predetermined time unit. Encoded data are grouped in blocks by a compression unit, GOP. The recording method records information indicating a head portion of a GOP as a reproduction start address. The FIG. 1 shows an arrangement of data array as one concept.

The current method mentioned above functions properly for a search reproduction under a condition of not updating a block data array such that a block data array is recorded on a read-only medium. However, some problems may happen when the block data array is updated. In case that a block data array is recorded on a rewritable recording medium, contents of the block data array can be edited. For example, it is conceivable that a reproduction is skipped by a block data unit during a period of "s" as shown in FIG. 2. Generally, it is not necessary to erase a block data to be skipped since information, which designates reproduction sections and reproduction sequence of the reproduction sections, is recorded on a recording medium as reproduction control data.

In case of skipping the block data "D" shown in FIG. 2, the reproduction period "s" for two block data "D" becomes zero in the reproduction mode, that is, two block data "D" equivalent to the reproduction period "s" are not reproduced and the reproduction is forwarded to the subsequent blocks after the block data "D". In addition thereto, the reproduction start address 3 shall be deleted from the collation table of time recording location since the reproduction start address 3 designates the section to be skipped. Further, all reproduction start addresses after the reproduction start address 4 and subsequent reproduction start addresses must be updated so as to designate correct location since the period "s" is independent of a period "u". Accordingly, it is necessary to recalculate address information based upon a correlation between a capacity of blocks subsequently to the block "D" and a reproduction period, and an editing process is disposed to be very complicated.

SUMMARY OF THE INVENTION

Accordingly, an object of the present invention is to provide an information recording medium recorded with a collation table of time recording location, which is suitable for editing of assigning a sectional skip, in conjunction with encoded data. Another object of the present invention is to provide an editing apparatus, which can assure simple and high speed editing.

In order to achieve the above object, the present invention provides, according to an aspect thereof, an information recording medium which comprises a first recording region recorded with a plurality of block data continuing in time sequence, wherein the plurality of block data are compressed by an encoding system of varying an amount of codes per each block after temporally continuing information signals are divided into a plurality of blocks, and comprises a second recording region recorded with at least more than one collation table of time recording location, wherein the collation table of time recording location is composed of more than one collation data by every fixed time interval for reproducing an arbitrary block data out of the plurality of block data recorded in the first recording region and time compensating data.

According to the aspect of the present invention, there provided an information recording medium which is further characterized by that the collation data includes a block data location information of designating a block data out of the plurality of block data recorded in the first recording region, which is reproduced at a timing of each fixed time interval "u" after reproduction begins with a head of the first recording region, and characterized by that the collation table of time recording location is recorded with continuous reproduction sections by "m" in the second recording region in case of "m" continuous reproduction sections existing in the first recording region by editing, where "m" is a natural number, and characterized by that a nth collation data of each collation table of time recording location, where "n" is a natural number, is composed of a combination of a block data location information designating the block data of one of the "m" continuous reproduction sections, which is reproduced at a time of (n×u)−c, where "u" is the aforementioned fixed time interval and "c" is a period of time, elapsed after reproduction begins with a head block data of one continuous reproduction section in response to the collation data and a time difference information of time difference between a reproduction start time of the block data designated by the block data location information and the time of (n×u)−c, and characterized by that the time compensating data is data of compensating the time "c", in case that the nth collation data is information of designating block data to be reproduced by the nth collation data at a time of (n×u)−c elapsed after the reproduction of the continuous reproduction section is started.

According to another aspect of the present invention, there provided an editing apparatus and method comprising readout means for reading out a collation table of time recording location from an information recording medium of rewritable, which is composed of a first recording region recorded with a plurality of block data continuing in time sequence, wherein the plurality of block data are compressed by an encoding system of varying an amount of codes per each block after temporally continuing information signals are divided into blocks by predetermined time unit, and composed of a second recording region recorded with at least more than one collation table of time recording location, wherein the collation table of time recording location includes more than one collation data by each fixed time interval for reproducing an arbitrary block data out of the plurality of block data in the first recording region and a first time compensating data. The editing apparatus further comprises memory means for temporarily storing the collation table of time recording location read out from the second recording region by the readout means, skipping period designating means for designating skipping period of skipping a part of continuous reproduction section of the block data recorded in the information recording medium, dividing means for dividing the collation table of time recording location read out from the memory means in response to the designated skipping period, deleting means for deleting collation data from the divided collation table of time recording location, wherein the collation data designates block data at a skipping period, calculating means for calculating a second time compensating data in response to the skipping period, writing back means for writing back to the memory means a collation table of time recording location newly composed of combining collation data succeeding the collation data deleted by the deleting means with the second time compensating data in conjunction with a collation table of time recording location composed of the first time compensating data and the collation data preceding the collation data deleted, and writing means for reading out a plurality of collation tables of time recording location written back to the memory means by the writing back means and for writing the plurality of collation tables of time recording location into the second recording region of the information recording medium.

Accordingly, the present invention provides a rewritable information recording medium. An information signal continuing in time sequence is divided into blocks by predetermined time unit. The rewritable information recording medium comprises a first recording region recorded with a plurality of block data in time sequence after the blocks have been compressed by an encoding system of which an amount of codes of each block varies and a second recording region which is recorded with more than one collation data per fixed time interval and at least more than one collation table of time recording location including a first time compensating data for reproducing an arbitrarily block data from the first recording region. In case that the rewritable information recording medium is edited so as to skip one section of a series of block data, the previously recorded collation table of time recording location is read out from the information recording medium and the collation data is divided into two sections by the dividing means so as to posses block data location information in each continuous reproduction section since the continuous reproduction section is divided into two sections.

Successively, collation data designating block data of assigned skipping period is deleted from a divided collation table of time recording location. Since it is necessary to add time compensating data newly for a group of collation data in response to a later continuous reproduction section located after a skipping period in time sequence, a duration of reproduction time of block data to be reproduced is calculated prior to block data designated by collation data at a head of a group of collation data in response to the later continuous reproduction section. A second time compensating data is calculated by the calculated duration of reproduction time. A new collation table of time recording location is composed by combining the second time compensating data with collation data after the deleted collation data, which is a group of collation data, in response to the later continuous reproduction section located after a skipping period in time sequence and is written in the second recording region of the information recording medium. Accordingly, the present invention assures that each collation data can accurately be acknowledged as information at a time elapsing from a head of a continuous reproduction section by reproducing by using the new collation table of time recording location.

Other object and further features of the present invention will be apparent from the following detailed description when read in conjunction with the accompanying drawings.

DETAILED DESCRIPTION OF THE PREFERRED EMBODIMENTS

[First Embodiment]

Figure 1:
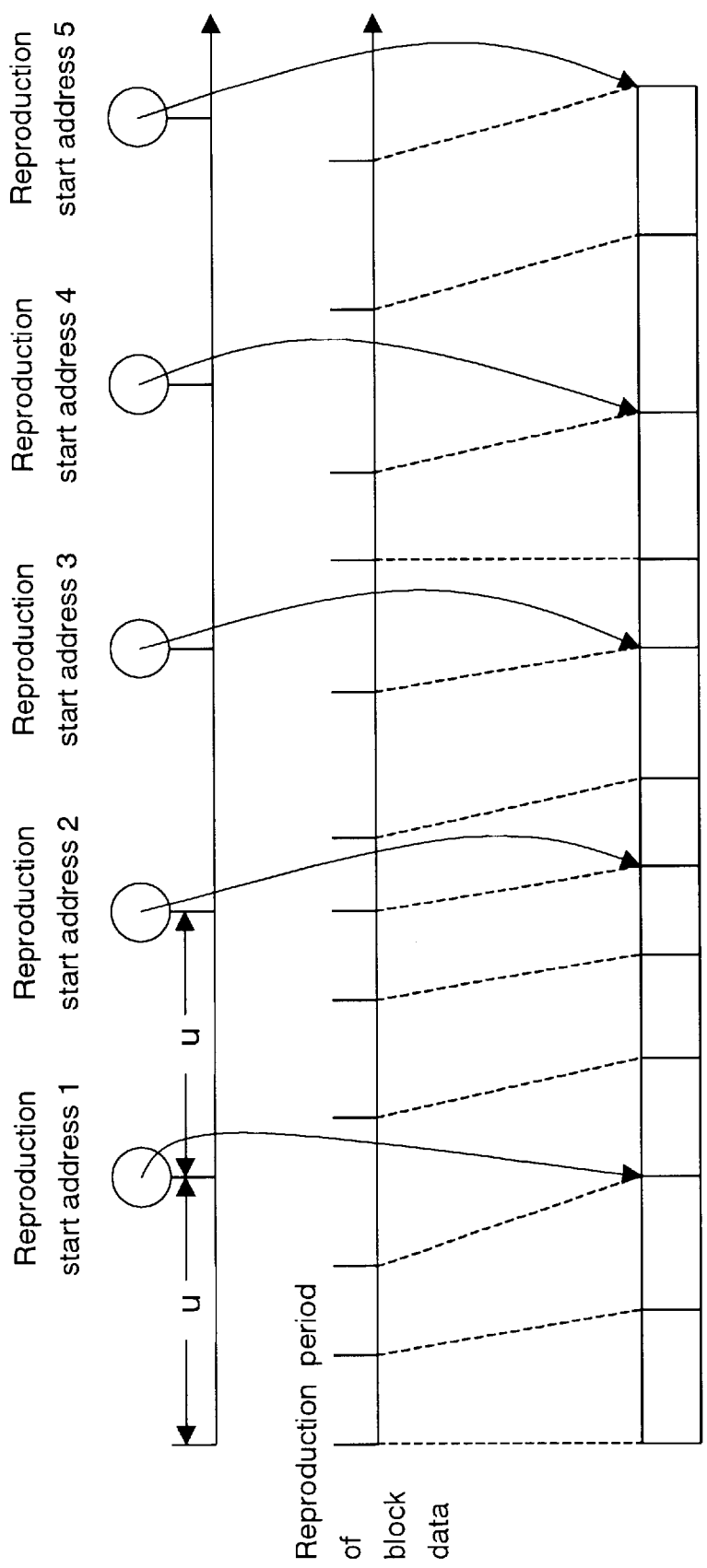
FIG. 1 shows an allocation of block data and a reproduction period according to the prior art.
Figure 2:
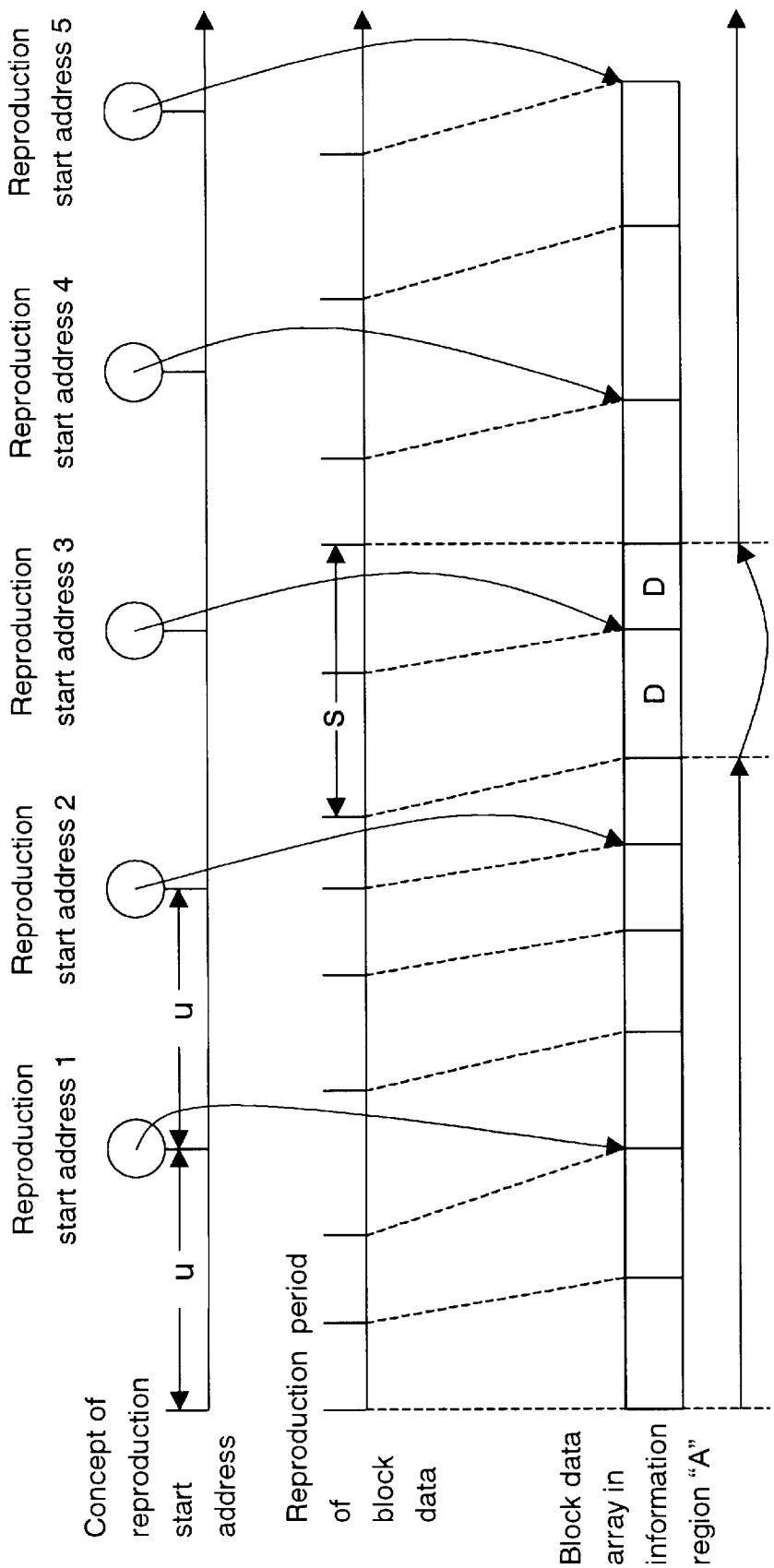
FIG. 2 shows a skip reproduction of block data according to the prior art.
Figure 3:
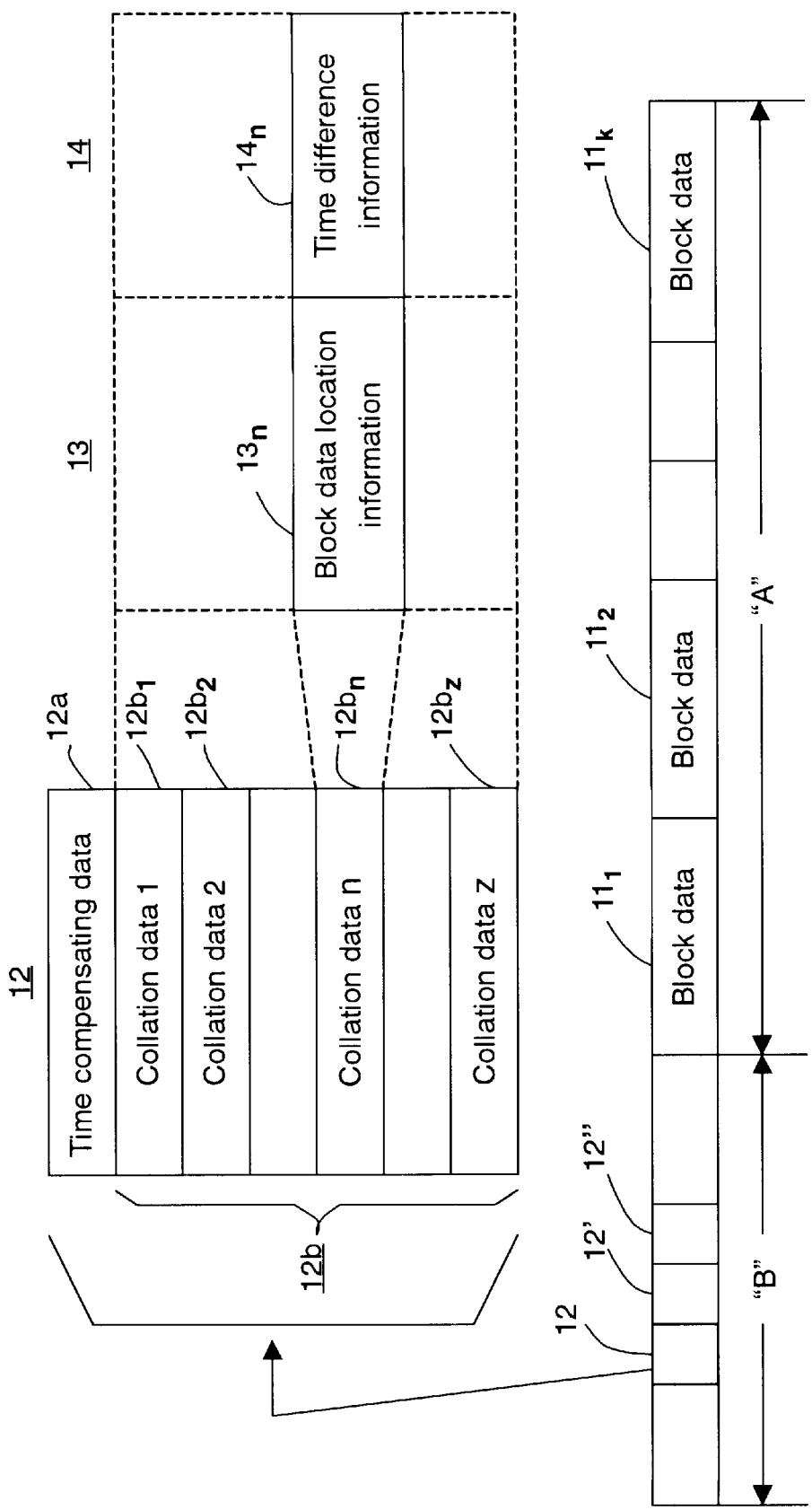
FIG. 3 shows an exemplary diagram of data allocation and a data format of collation data of time recording location in an information recording medium according to a first embodiment of the present invention.

FIG. 3 is an exemplary diagram of data allocation and a data format of collation data of time recording location in an information recording medium according to a first embodiment of the present invention.

Figure 4:
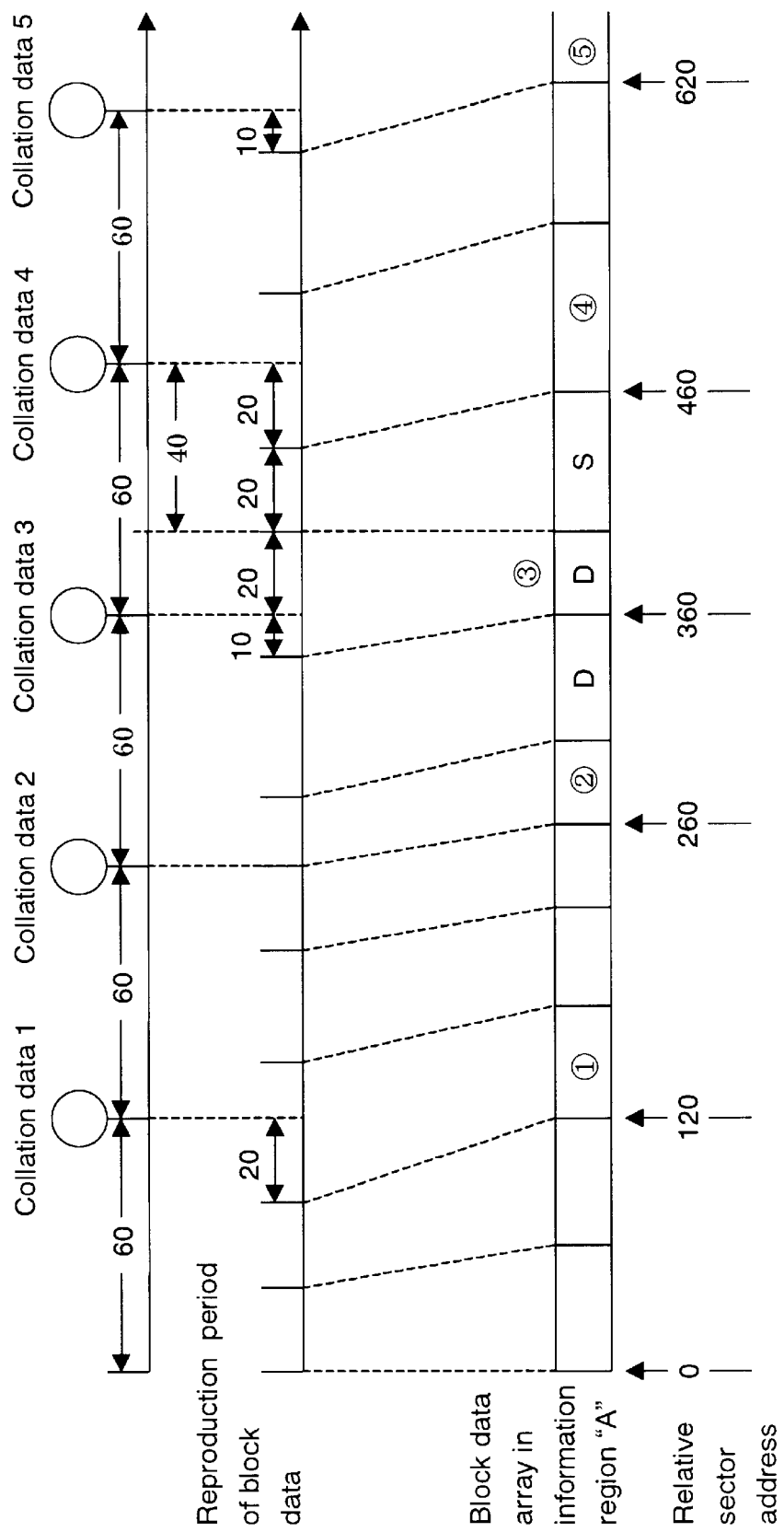
FIG. 4 shows a correlation among a data block at an initial recording, a designated skipping period and collation data of the information recording medium according to the first embodiment of the present invention.

FIG. 4 shows a correlation among a data block at an initial recording, a designated skipping period and collation data of the information recording medium according to the first embodiment of the present invention.

Figure 5:
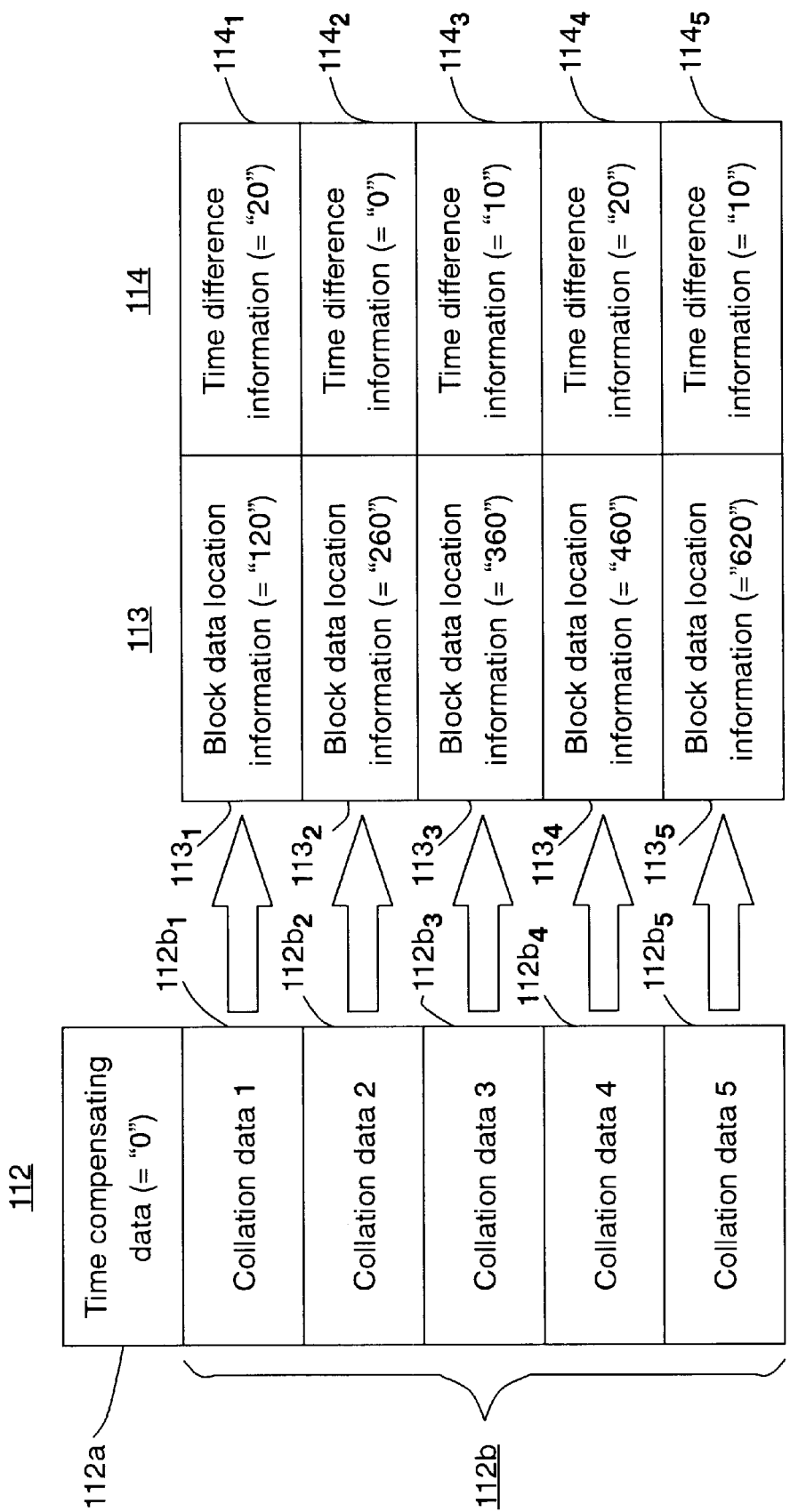
FIG. 5 shows an example of a collation table of time recording location.

FIG. 5 is an example of a collation table of time recording location.

An information recording medium disclosed herein, as an embodiment is a rewritable information recording medium, which is divided into plural sectors in a prescribed data volume. Information continuing in time sequence is divided into blocks. An amount of codes per each block is variable and the blocks are encoded so as to be an integer multiple of sectors after data are compressed.

As shown in FIG. 3, "k" block data from $11_1$ to $11_k$ are recorded in an information region "A" or an information recording region "A" of an information recording medium continuously in time sequence, where "k" is a natural number in response to a length of information to be recorded. Three collation data 12, 12' and 12" of time recording location are recorded in an information region "B" or an information recording region "B" of the information recording medium, wherein the information region "B" is a different information region from the information region "A" in the information recording medium. A collation data 12 of time recording location comprises a time compensating data 12b and "z" collation data 1 through "z" or $12b_1$ through $12b_z$, where "z" is a natural number. The collation data 12b is further composed of a block data location information 13 and a time difference information 14. In other words, for example, an nth collation data $12b_n$ is composed of a block data location information $13_n$ and a time difference information $14_n$. With respect to the above-mentioned information continuing in time sequence, for example, it is video information, which is compressed and encoded by the MPEG (Moving Picture Experts Group) system and composed of block data in GOP (Group Of Picture) unit. However, further details of the MPEG system or GOP is not depicted herein since they are not a subject matter of the present invention.

It will be mentioned that the collation data 12 of time recording location is recorded in the information region "B" by "m" if "m" continuous reproduction sections exist in the information region "A" by editing. FIG. 3 shows, as an example that the "m" is equal to three and the "m" is equal to one at an initial recording before editing.

In FIG. 3, the time compensating data 12a is data of compensating a time "c" if the nth collation data $12b_n$ after editing becomes information at a time of (n×u)−c elapsed since a reproduction is started, where "u" is a period of a fixed time interval.

Each collation data 12b from $12b_1$ to $12b_n$ is data by every fixed time interval "u". The block data location information $13_n$ of the nth collation data $12b_n$ in the collation data 12 of time recording location indicates a location of a block data being reproduced at a time when a time of (n×u)−c elapses since the reproduction has been started from a block data at a head of one continuous reproduction section in the information region "A", which is in response to the collation data 12 of time recording location. The time difference information 14 indicates a time difference between a reproduction start time of a block data specified by the block data location information 13 and the above-mentioned time of (n×u)−c. In case that information have been recorded on an information recording medium at first, that is, in case that an information recording medium is in initial conditions before the information recording medium is rewritten by editing, a group of block data $11_1$ through $11_k$ are continuously reproduced. Further, a search reproduction in response to a designated timing can be performed by the collation data 12 of time recording location.

FIG. 4 is an exemplary diagram showing a relation between block data at an initial recording mode and collation data recorded on an information recording medium in accordance with the present invention. In FIG. 4, a period of a fixed time interval "u" is "60", wherein a unit of "60" is usually second, however, frame is also acceptable as a unit. Five collation data 1 through 5 are recorded in an information region "B". A plurality of block data such as ①through ⑤, "D", and "s" are recorded in an information region "A". A relative sector address originated from a head of the information region "A" is utilized for block data location information indicated by the collation data 1 through 5. As shown in FIG. 4, block data location information indicated by the collation data 1 through 5 are start addresses of each block data shown by ① through ⑤, that is, each relative sector address of the block data ① through ⑤ is "120", "260", "360", "460", and "620" respectively.

Accordingly, the collation data 112 of time recording location recorded in the information region "B" in an initial recording mode is as follows. As shown in FIG. 5, a collation data 112 of time recording location comprises a time compensating data 112a and collation data 112b, which is composed of 5 collation data 1 through 5 or $112b_1$ through $112b_5$. The collation data 112b of time recording location is further composed of block data location information 113 or $113_1$ through $113_5$ and time difference information 114 or $114_1$ through $114_5$. It is defined that a value of the time compensating data 112a is zero, a block data location information 113 is the value of the relative address mentioned above, and the time difference information 114 is the value shown in FIG. 5 based upon FIG. 4. In other words, each value of the block data location 113 or $113_1$ through $113_5$ is "120", "260", "360", "460" and "620" respectively. For example, a relative address of the block data location information 113 of the fourth collation data $112b_4$ indicating a block location of the data block ④ is "460" as shown in FIG. 4. Each value of the time difference information 114 or $114_1$ through $114_5$ is "20", "0", "10", "20" and "10" respectively. For example, the time difference information $114_4$ is "20" as shown in FIG. 5, because a reproduction start time is earlier than a total amount or an accumulated value of periods of fixed time intervals by "20" as shown in FIG. 4.

The collation data 112 of time recording location mentioned above forms a table in connection with a combination of the collation data 112b, the block data location information 113, and the time difference information 114. Therefore, the collation data 112 of time recording location is also called as a collation table 112 of time recording location.

[Second Embodiment]

Figure 6:
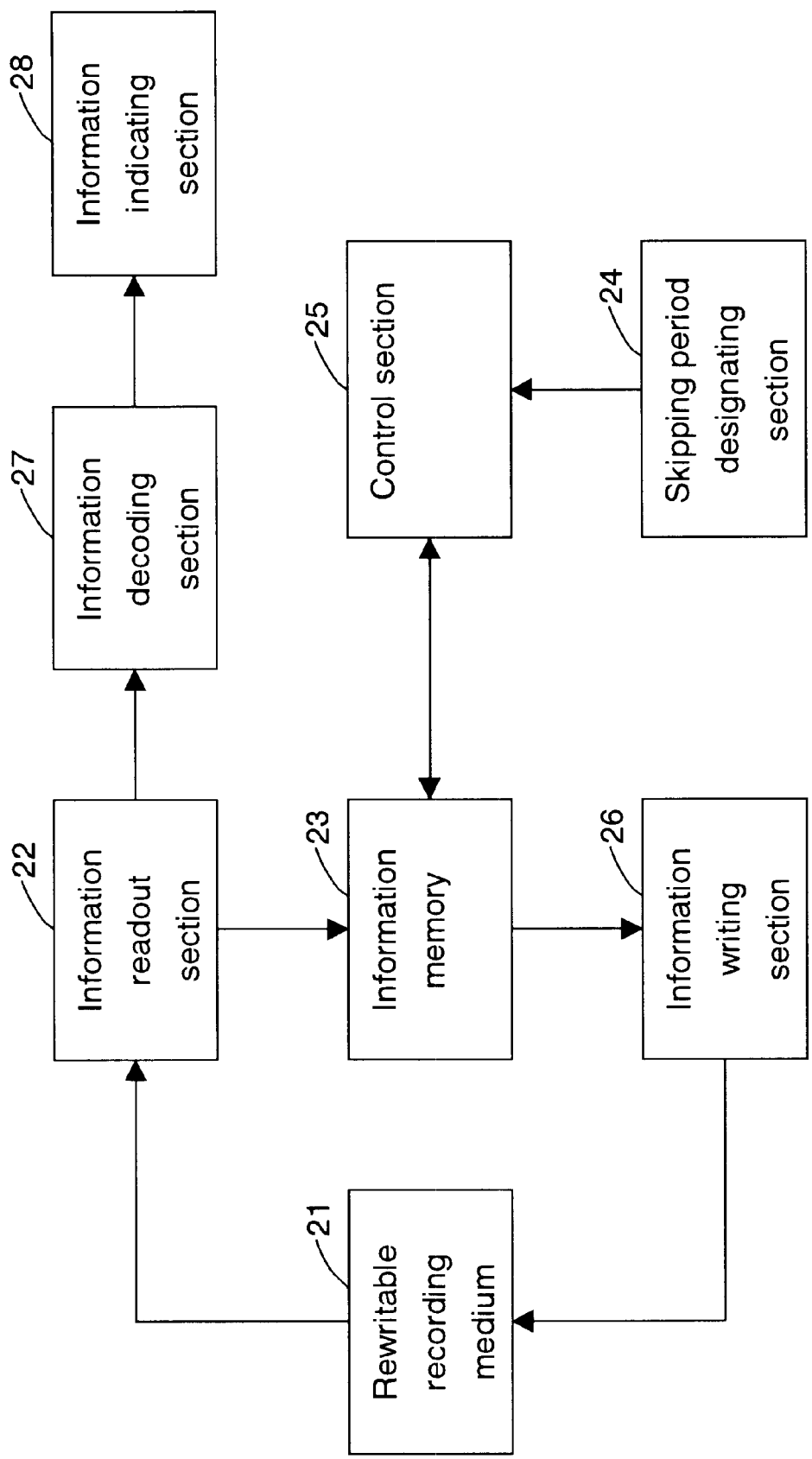
FIG. 6 shows a block diagram of an editing apparatus according to a second embodiment of the present invention.

FIG. 6 is a block diagram of an editing apparatus according to a second embodiment of the present invention.

FIGS. 7(a) through 7(d) are exemplary diagrams of processing a collation table of time recording location by the editing apparatus shown in FIG. 6.

Figure 8:
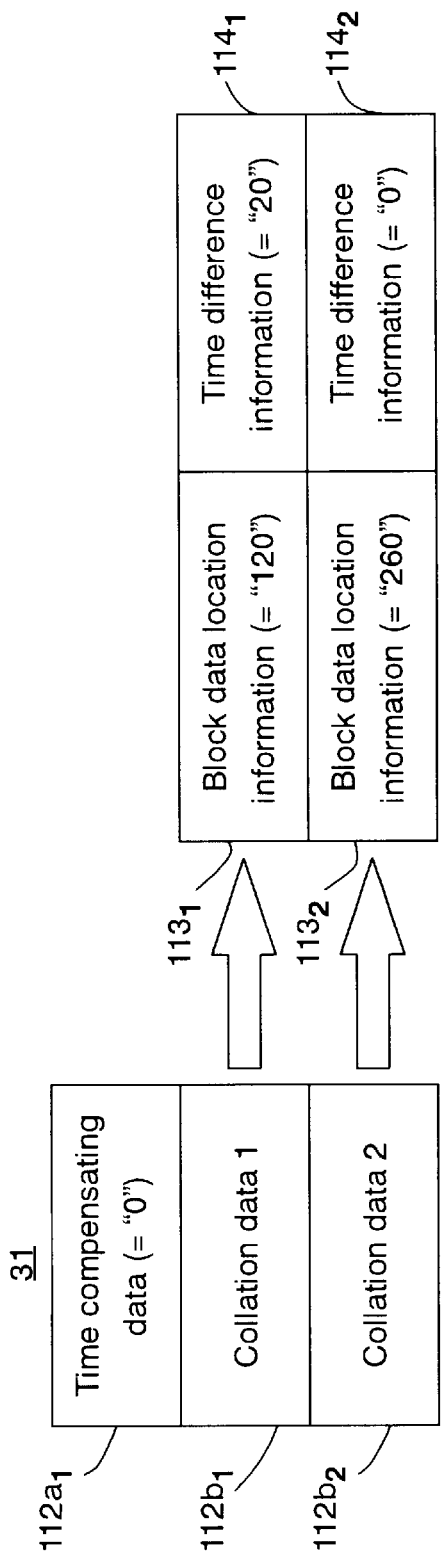
FIG. 8(a) shows an exemplary diagram of a first collation table of time recording location related to collation data "1" and "2" shown in FIG. 7(d) after the collation table of time recording location is edited by the editing apparatus shown in FIG. 6.
FIG. 8(b) shows an exemplary diagram of a second collation table of time recording location related to collation data "4" and "5" shown in FIG. 7(d) after the collation table of time recording location is edited by the editing apparatus shown in FIG. 6.
Figure 8:
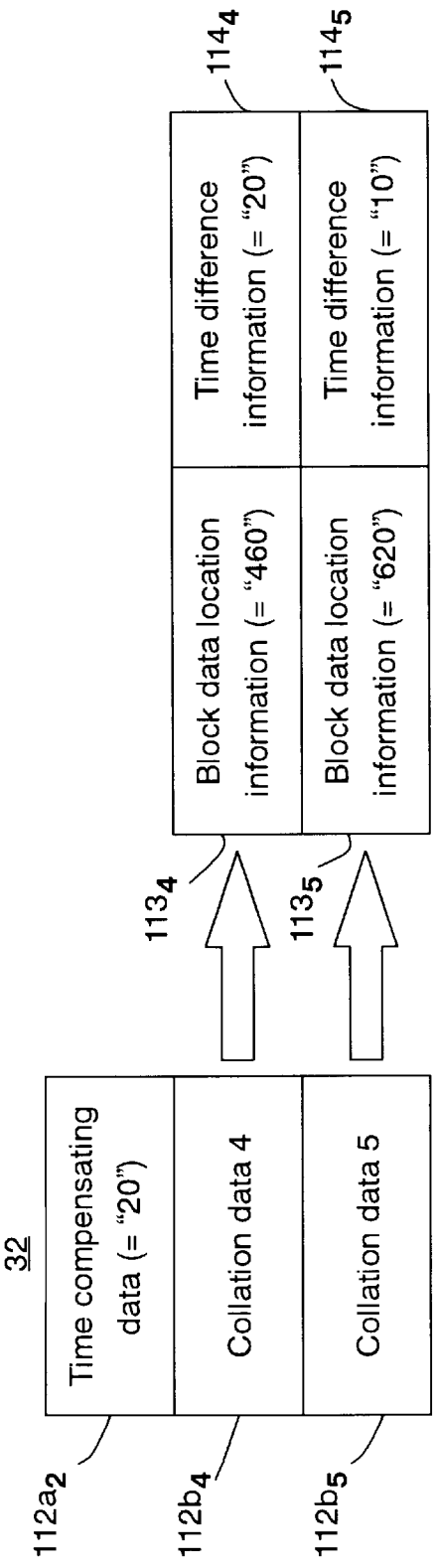

FIGS. 8(a) and 8(b) are exemplary diagrams of a first and a second collation tables of time recording location after edited by the editing apparatus shown in FIG. 6.

As shown in FIG. 6, an editing apparatus in accordance with the present invention comprises an information readout section 22 which reads out or reproduces a collation table of time recording location from a rewritable recording medium 21 which is an information recording medium of the present invention, an information memory 23 which stores temporarily the collation table of time recording location read out from the rewritable recording medium 21 by the information readout section 22, a skipping period designating section 24 which indicates a skipping period, a control section 25 which performs various processes depicted below in response to a skipping period designated to the collation table of time recording location and writes the collation table of time recording location processed back to the information memory 23, an information writing section 26 which writes information wrote back to the information memory 23 into the rewritable recording medium 21, an information decoding section 27, and an information indicating section 28.

The control section 25 respectively executes a dividing process for the collation table of time recording location in response to the designated skipping period, a deleting process of collation data, a calculating process of time compensating data, and a write back process of writing a plurality of compensating tables, which are composed with combining divided and partially deleted collation data and time compensating data, back to the information memory 23. The information decoding section 27 decodes block data read out by the information readout section 22. The information indicating section 28 indicates video information decoded by the information decoding section 27.

Figure 7:
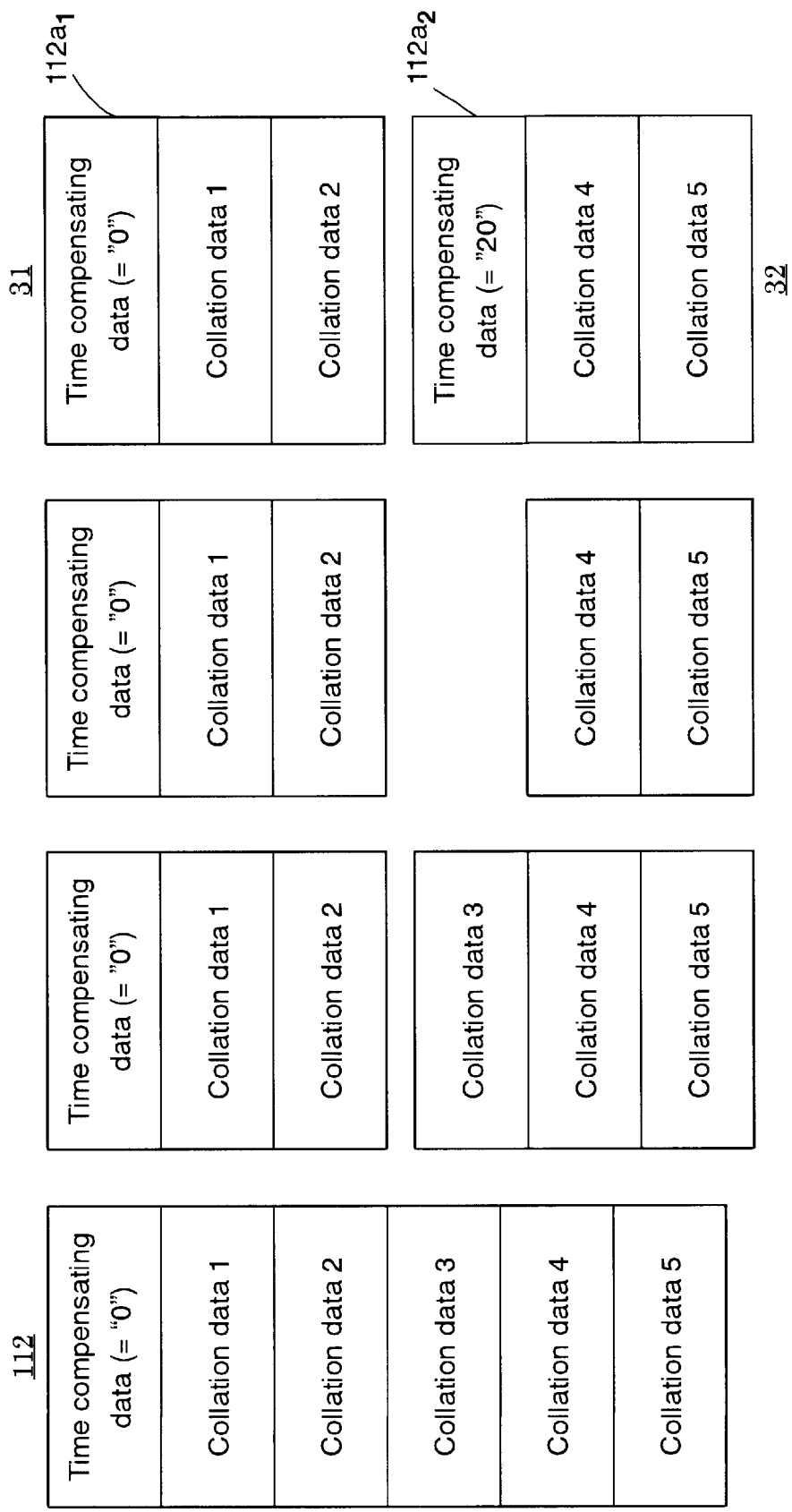
FIG. 7(a) shows an exemplary diagram of the collation table of time recording location read out by the editing apparatus shown in FIG. 6.
FIG. 7(b) shows an exemplary diagram of the collation table of time recording location after the collation table of time recording location is divided into two parts in between collation data "2" and "3" by the editing apparatus shown in FIG. 6.
FIG. 7(c) shows an exemplary diagram of the collation table of time recording location after a collation data "3" is deleted by the editing apparatus shown in FIG. 6.
FIG. 7(d) shows an exemplary diagram of the collation table of time recording location after a second collation table of time recording location is composed.

When block data "D" shown in FIG. 4 are designated to be skipped by the skipping period designating section 24, a process related to a collation table 112 of time recording location shown in FIG. 7(a) by the editing apparatus shown in FIG. 6 is depicted below. As shown in FIG. 7(a), the collation table 112 of time recording location, which is read out from the rewritable recording medium 21 by the information readout section 22 shown in FIG. 6 and is transferred to the information memory 23, is a same collation table of time recording location as that of the rewritable recording medium 21 in an initial recording mode as shown in FIG. 5.

A skipping indication designated by the skipping period designating section 24 indicates that the block data "D" shown in FIG. 4 shall be skipped. Since a skipping is performed in between the block data ② indicated by the collation data 2 and the block data ④ indicated by the collation data 3, the control section 25 divides one block data array into two at a start timing as a dividing point in between the collation data 2 and 3 as shown in FIG. 7(b).

As shown in FIG. 7(c), the control section 25 deletes the collation data 3, which directs the block data ③ shown in FIG. 4 to be skipped, then the control section 25 calculates time compensating data for a period after skipping. In other words, the control section 25 accumulates reproduction periods from a block data after skipping to a block data immediately before the block data ④ shown in FIG. 4 designated by the collation data 4, and calculates a time compensating data by a following equation.

Time compensating data=fixed time interval−(accumulated value+ time difference information of the collation data 4)

In case of FIG. 4 as an example, one block data shown by "s" is existed immediately before the block data ④ designated by the collation data 4. A value "20" of reproduction period, which is the reproduction period of the block data "s", is calculated. A value "20" of the time difference information $114_4$, which is inherent to the fourth collation data $112b_4$ as shown in FIG. 5, is added to the value "20" of reproduction period, which is the reproduction period of the block data "s". A sum of the value "20" of reproduction period and the value "20" of the time difference information is subtracted from the fixed time interval "u", that is, "60", then "20" is calculated as time compensating data. In other words, a result of calculation of the above mentioned equation is as follows:

Time compensating data=60−(20+20)=20

Accordingly the value "20" of the time compensating data is calculated.

As shown in FIG. 7(d), the control section 25 adds the time compensating data $112a_2$ calculated as mentioned above to the collation data 4 and 5 continuing immediately after a deleted collation data, which is a group of collation data in response to continuous reproduction sections succeeding to a skipping period in time sequence. Then a second collation table 32 of time recording location is composed as shown in FIG. 7(d). The second collation table 32 of time recording location is wrote back to the information memory 23 in conjunction with a first collation table 31 of time recording location, which is a combination of a time compensating data $112a_1$ and the collation data 1 and 2. The collation tables 31 and 32 of time recording location shown in FIG. 7(d), which are wrote back to the information memory 23, are read out and wrote in the information region "B" of the rewritable recording medium 21 by the information writing section 26.

Detail of collation table of time recording location, which is written in the rewritable recording medium 21, is depicted in FIGS. 8(a) and 8(b). In FIG. 8(a), the first collation table 31 of time recording location is composed of a time compensating data $112a_1$ and collation data 1 and 2 or $112b_1$ and $112b_2$. Each of the collation data $112b_1$ and $112b_2$ is further composed of a block data location information $113_1$ or $113_2$ and a time difference information $114_1$ or $1142$ respectively. In FIG. 8(b), the second collation table 32 of time recording location is composed of a time compensating data $112a_2$ and collation data 4 and 5 or $112b_4$ and $112b_5$. Each of the collation data $112b_4$ and $112b_5$ is further composed of a block data location information $113_4$ or $113_5$ and a time difference information $114_4$ or $114_5$ respectively. In other words, one collation table is prepared for a continuous reproduction section. A collation table of time recording location prior to editing shown in FIG. 5 can be deleted when normal writing back is confirmed.

Accordingly, a search operation can be accurately performed when a rewritable recording medium is reproduced, in consideration of that a collation data is information at earlier timing than that of a regular timing by a time designated by a time compensating data. For example, in FIG. 4, a continuous reproduction section continuing after a skipping period begins with the block data "s". The collation data 4, which is a first collation data from a starting point of continuous reproduction, is information at a time of "40" elapsed after the starting point of continuous reproduction of the block data "s", not at a regular elapsed time of "60". In other words, it is apparent that the collation data 4 is not the information at the regular time of "60" elapsed after the starting point of the continuous reproduction but the information at the elapsed time of "40", which is earlier than the regular elapsed time of "60" by "20" as indicated in a time compensating data "20" of the second collation table 32 of time recording location as shown in FIG. 8(b). Therefore, a reproduction apparatus can accurately perform a search operation. In the aforementioned equation, the accumulated value can be employed as a time compensating data, since an accumulated value is only an item to be actually calculated.

According to the aspect of the present invention, search reproduction at a designated time will not fail since each collation data can accurately be known as information at a time from a head of a continuous reproduction section during reproduction after editing. In addition thereto, simple and high speed editing can be performed since almost all collation data in a collation table of time recording location are not necessary to be updated.

What is claimed is:

1. An information recording medium of rewritable, said information recording medium comprising:
    a first recording region recorded with a plurality of block data continuing in time sequence, wherein said plurality of block data are compressed by an encoding system of varying an amount of codes per each block after temporally continuing information signals are divided into a plurality of blocks; and
    a second recording region recorded with at least more than one collation table of time recording location, wherein said collation table of time recording location is composed of more than one collation data by every fixed time interval for reproducing an arbitrary block data out of said plurality of block data recorded in said first recording region and time compensating data.

2. An information recording medium in accordance with claim 1, wherein said collation data includes a block data location information of designating a block data out of said plurality of block data recorded in said first recording region, said block data is reproduced at a timing of each fixed time interval "u" after reproduction begins with a head of said first recording region, wherein said collation table of time recording location is recorded with continuous reproduction sections by "m" in said second recording region in case of "m" continuous reproduction sections existing in said first recording region by editing, where "m" is a natural number, wherein a nth said collation data, where "n" is a natural number, in each said collation table of time recording location is composed of a combination of a block data location information designating said block data of one of said "m" continuous reproduction sections reproduced at a time of (n×u)−c, where "u" is said fixed time interval and "c" is a period of time, elapsed after reproduction begins with a head block data of one continuous reproduction section in response to said collation data and a time difference information of time difference between a reproduction start time of the block data designated by said block data location information and said time of (n×u)−c, and wherein said time compensating data is data of compensating the time "c", in case that nth said collation data is information of designating block data to be reproduced at a time of (n×u)−c elapsed after the reproduction of said continuous reproduction section is started.

3. An editing apparatus and method comprising:
    readout means for reading out a collation table of time recording location from an information recording medium of rewritable, said information recording medium being composed of a first recording region recorded with a plurality of block data continuing in time sequence, wherein said plurality of block data are compressed by an encoding system of varying an amount of codes per each block after temporally continuing information signals are divided into blocks by predetermined time unit, and said information recording medium further composed of a second recording region recorded with at least more than one collation table of time recording location, wherein said collation table of time recording location includes more than one collation data by each fixed time interval for reproducing an arbitrary block data out of said plurality of block data in said first recording region and a first time compensating data;
    memory means for temporarily storing said collation table of time recording location read out from said second recording region by said readout means;
    skipping period designating means for designating skipping period of skipping a part of a continuous reproduction section of said block data recorded in said information recording medium;
    dividing means for dividing said collation table of time recording location read out from said memory means in response to designated said skipping period;
    deleting means for deleting collation data from divided said collation table of time recording location, said collation data designating block data at a designated skipping period;
    calculating means for calculating a second time compensating data in response to said skipping period;

writing back means for writing back to said memory means a collation table of time recording location newly composed of combining collation data succeeding said collation data deleted by said deleting means with said second time compensating data in conjunction with a collation table of time recording location composed of said first time compensating data and said collation data preceding said collation data deleted; and writing means for reading out a plurality of said collation table of time recording location written back to said memory means by said writing back means and for writing a plurality of said collation table of time recording location into said second recording region of said information recording medium.

* * * * *